United States Patent
Agranat et al.

[11] Patent Number: 5,291,314
[45] Date of Patent: Mar. 1, 1994

[54] SPATIAL LIGHT MODULATOR DEVICE AND A CONOSCOPIC HOLOGRAPHY SYSTEM OF LARGE DYNAMIC RANGE INCLUDING SUCH A MODULATOR DEVICE

[75] Inventors: Aharon Agranat; Gabriel Sirat, both of Paris, France

[73] Assignee: France Telecom, Paris, France

[21] Appl. No.: 736,291

[22] Filed: Jul. 29, 1991

[30] Foreign Application Priority Data

Jul. 27, 1990 [FR] France ............... 90 09630

[51] Int. Cl.⁵ .............. G02B 5/23; G02B 1/02; G02F 1/35; G03H 1/00
[52] U.S. Cl. ...................... 359/100; 359/11; 359/241
[58] Field of Search ............ 359/1, 241, 260, 244, 359/11, 242, 243, 237

[56] References Cited

U.S. PATENT DOCUMENTS

| | | | |
|---|---|---|---|
| 3,512,870 | 5/1970 | Wilson, Jr. et al. | 359/260 X |
| 3,552,824 | 1/1971 | Kiss . | |
| 3,938,878 | 2/1976 | Fox | 359/259 X |
| 4,558,923 | 12/1985 | Hoffman et al. | 359/243 |
| 4,597,638 | 7/1986 | Chemla et al. | 359/244 |
| 4,602,844 | 7/1986 | Sirat et al. | 359/30 |
| 4,815,799 | 3/1989 | Goldstein et al. | 359/241 |
| 4,834,511 | 5/1989 | Bennion et al. | 359/241 |
| 4,854,677 | 8/1989 | O'Meara | 359/242 |
| 4,871,235 | 10/1989 | Greene et al. | 359/241 |
| 4,877,312 | 10/1989 | Huignard et al. . | |
| 4,900,134 | 2/1990 | Inoue et al. | 359/241 |
| 4,929,063 | 5/1990 | Durand et al. | 359/241 |
| 4,976,504 | 12/1990 | Sirat et al. | 359/10 |
| 5,002,369 | 3/1991 | Sakata | 354/241 |
| 5,062,693 | 11/1991 | Beratan et al. | 359/241 |
| 5,076,672 | 12/1991 | Tsuda et al. | 359/241 |

OTHER PUBLICATIONS

Agranat et al, "Voltage-Controlled Photorefractive Effect in Paraelectric $KTa_{1-x}Nb_xO_3$: Cu, V", Optics Letters, No. 18, vol. 14, Sep. 1989, pp. 1017-1019.

Appl. Phys. Lett., vol. 34, No. 8, Apr. 1979, pp. 511-514, American Institute of Physics; H. M. Gibbs et al.: "Optical modulation by optical tuning of a cavity".

N.T.I.S. Tech Notes, Oct. 1986, p. 1063, Springfield, Va., U.S.; G. K. Schwemmer: "Electro-optical tuning of fabry-perot interferometers".

*Primary Examiner*—Constantine Hannaher
*Assistant Examiner*—Edward J. Glick
*Attorney, Agent, or Firm*—Larson and Taylor

[57] ABSTRACT

The invention relates to a spatial light modulator device comprising a photo-refractive crystal addressed by means of a write light beam and a read light beam. The crystal is placed in the cavity of an interferometer system having a transmittivity-optical path length characteristic of steep slope so as to give rise to a dynamic range of maximum transmittivity variation for minimum variation in the refractive index or optical path length of the photo-refractive crystal. The device is applicable to conoscopic holography systems of large dynamic range and to pattern recognition in real time.

17 Claims, 3 Drawing Sheets

SPATIAL LIGHT MODULATOR DEVICE AND A CONOSCOPIC HOLOGRAPHY SYSTEM OF LARGE DYNAMIC RANGE INCLUDING SUCH A MODULATOR DEVICE

The invention relates to a spatial light modulator device and to a conoscopic holography system of large dynamic range including such a modulator device.

BACKGROUND OF THE INVENTION

Spatial light modulators presently constitute one of the essential components of most systems for processing information optically.

An essential category of such components is formed by spatial light modulators which are capable of being written to optically and which serve to convert an input light beam or field into an output light beam or field, the output light beam containing a copy of the input information or "image" contained in the input light beam. However, the optical properties of the output light beam are adapted to satisfy the requirements of the optical processing system placed downstream from the modulator. For a more detailed description of such components and the essential characteristics thereof, reference may be made to the work edited by Neil Collings entitled "Optical pattern recognition", Chapter 4 "Spatial light modulators" published by Addison-Wesley Publishing Company ISBN 0 201 14549 9.

In conoscopic holography devices, a birefringent crystal placed between two circular polarizers is illuminated with non-coherent light in order to obtain a holographic image of the image of an initial object. In general, it is considered that the ordinary light beam and the extraordinary light beam derived from the initial image by the birefringent crystal are equivalent to the object light beam and to the reference beam in coherent light holography. For a more detailed description of this type of device, reference may be made, for example, to U.S. Pat. No. 4,976,504. Compared with coherent light holography devices, the above-mentioned conoscopic holography devices have the advantage of simplified implementation of a birefringence crystal by means of circular polarizers, the illuminating beam being a non-coherent monochromatic beam.

However, such devices generate a conoscopic image beam which includes a large unmodulated or "continuous wave" (CW) component inherent to spatial amplitude modulation of the input light beam to make the image containing the input information. Such a CW component suffers from the drawback of greatly limiting the signal to noise ratio of the corresponding conoscopic holography devices. Such a CW component due to the intensity of the input light beam prior to forming the image of the object to be processed by conoscopic holography cannot be eliminated physically either before or after processing by conoscopic holography, since any optical preprocessing followed by conversion into corresponding electronic signals will necessarily degrade the looked-for information obtained by holographic processing.

An object of the invention is to remedy the above drawbacks by implementing a spatial light modulator device that makes it possible to adjust the operation point and to reduce or eliminate the CW component of an input beam while retaining the amplitude dynamic range qualities of the transmitted input beam and of a corresponding read light beam so as to increase the signal to noise ratio on detection.

Another object of the present invention is to implement a spatial light modulator device in which the write light beam may be constituted by a non-coherent light beam while, on the contrary, the read beam may be constituted by a beam of coherent light so as to convert non-coherent information into coherent information for the purpose of reconstructing the coherent information in real time.

SUMMARY OF THE INVENTION

The spatial light modulator device of the present invention includes a crystal. It includes the improvement whereby said crystal is placed in the cavity of an interferometer system having a transmittivity-optical path length characteristic of steep slope so as to induce a dynamic range of maximum variation in the transmittivity for minimum variation in the refractive index of said crystal. The system is written to by means of a write light beam which modifies the refractive index of the crystal and thus its optical path length, and the system is read from by means of a read light beam modulated by the variation in transmittivity.

The spatial light modulator device of the present invention is particularly applicable firstly to conoscopic holography and secondly to systems for recognizing patterns in real time because of the possibility of transforming non-coherent information into coherent information.

BRIEF DESCRIPTION OF THE DRAWINGS

Embodiments of the invention are described by way of example with reference to the accompanying drawings, in which.

DETAILED DESCRIPTION

Figure 1A:
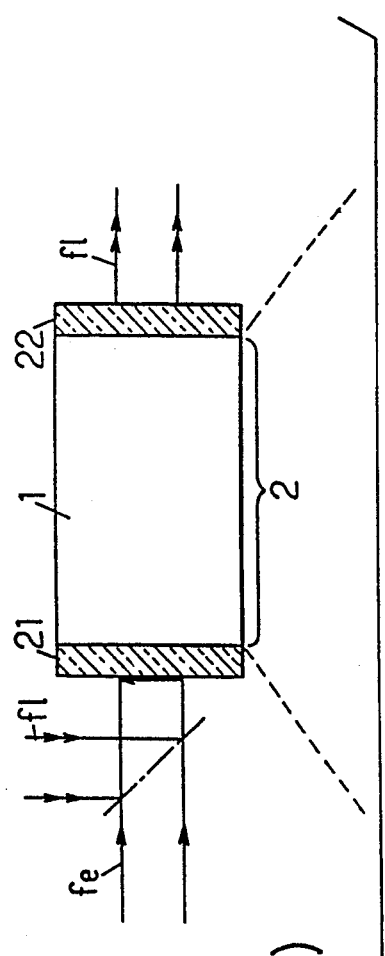
FIGS. 1a and 1b show respectively the general structure and the transmittivity-optical path length characteristic of a spatial light modulator device of the invention.
Figure 1B:
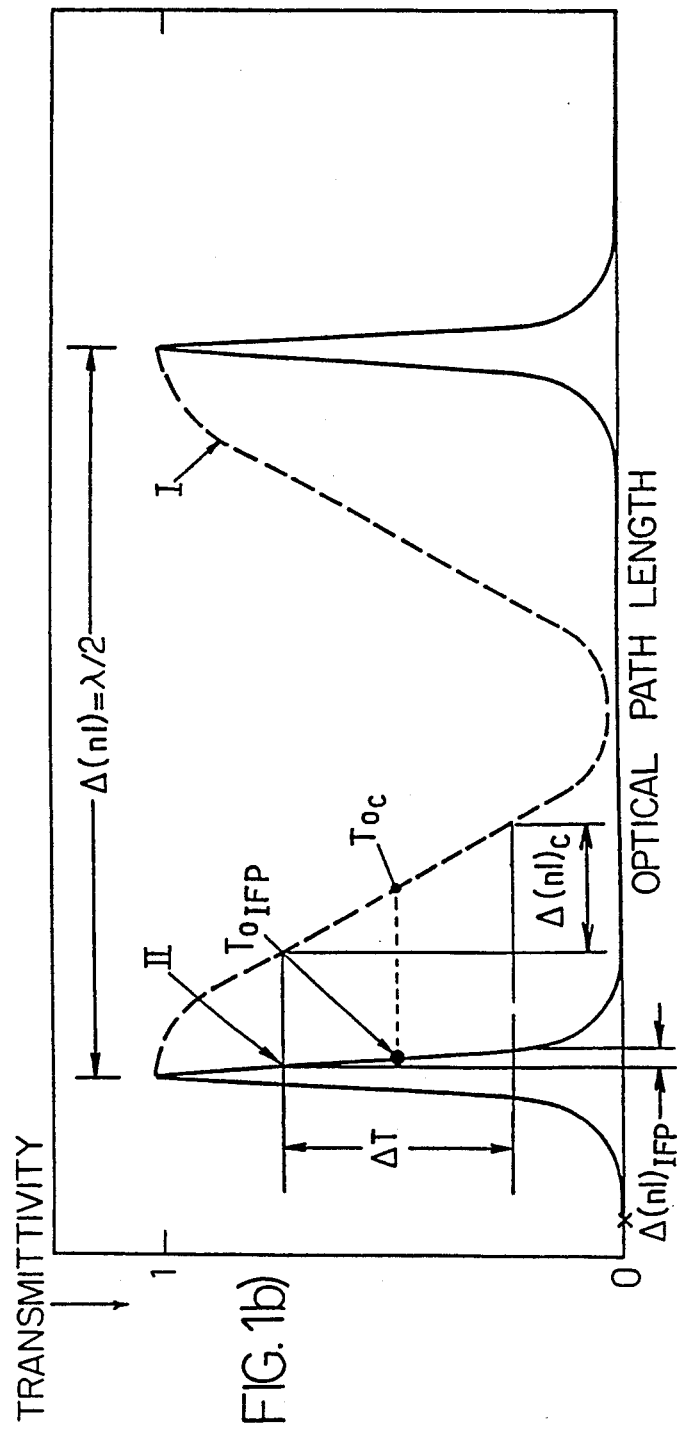

A more detailed description of a spatial light modulator device of the present invention is now given with reference to FIGS. 1a and 1b.

In the Figures, the spatial light modulator device of the invention comprises a crystal referenced 1. The crystal 1 is said to be "photo-refractive" and may be photo-refringent and/or photochromic.

A first light beam, namely a write light beam fe, is emitted at a wavelength $\lambda e$ that is absorbed by the crystal, and is incident on the crystal 1. The light beam is absorbed, and by the photo-refringent or the photochromic effect it creates variations in the refractive index. A second light beam, namely a read light beam fl, is emitted at a wavelength $\lambda l$ at which the crystal is intrinsically transparent, and it is modulated by a Fabry-Perot interferometer whose transmittivity is a function of the change in refractive index generated by the write beam fe.

The fact that the two beams are at different wavelengths thus makes it simple to combine them and then separate them by means of dichroic filters or other similar optical components.

In accordance with a particularly advantageous aspect of the spatial light modulator device of the present invention, as shown diagrammatically in FIG. 1a, the crystal 1 is placed in the cavity of an interferometer system 2. In FIG. 1a, the interferometer system is represented by two semitransparent walls symbolizing the optical cavity of the interferometer system 2.

In general, the interferometer system could be constituted by any conventional system having a transmittivity-optical path length characteristic of steep slope so as to induce a dynamic range of maximum transmittivity variation for minimum variation in the refractive index of the photo-refractive crystal, in the optical path length of the interferometer or both.

It will naturally be understood that inserting the crystal 1 in the cavity of an interferometer system 2 having the above-mentioned transmittivity-optical path length characteristic makes it possible to increase the dynamic range of amplitude variation in the image or the information concerning the object to be represented as conveyed by the write beam fe, and thus improving contrast compared with the CW component of the same write beam fe. The final effect of such improvement is to increase the refractive index modulation caused in the crystal by the write light beam fe, so that the seam transmittivity variation in the device is thus obtainable for a variation of smaller amplitude in its refractive index thereof, as described below.

In a preferred embodiment, the interferometer system 2 may be formed by a Fabry-Perot type interferometer. In this case, the interferometer system 2 is constituted by semi-reflecting mirrors referenced 21 and 22 in FIG. 1a, these mirrors delimiting the optical cavity of interferometer.

A more detailed description of the operating conditions of the spatial light modulator device of the present invention, as shown in FIG. 1b.

FIG. 1b is a graph in which relative transmittivity is plotted up the Y axis while optical path length, i.e. the product of the geometrical size of the crystal 1 in the propagation direction of the write beam fe or of the red beam fl through the crystal multiplied by the refractive index of the crystal, is plotted along the X-axis.

In FIG. 1b, I is a dashed-line curve showing transmittivity as a function of optical path lengths through a spatial light modulator device of conventional type, i.e. a spatial light modulator device constituted solely by a photo-refractive crystal. For an optical path length written $\Delta(nl)$ of the half-wave crystal, i.e. $\Delta(nl) = \lambda/2$ where $\lambda$ is the wavelength of the written beam fe or of the read beam fl in the crystal under consideration, curve I is generally sinusoidal in shape and the optimum transmittivity value under such circumstances for obtaining the best amplitude dynamic range in the signal, i.e. the value of transmittivity referenced $T_{OC}$, is situated at one-half the value of the maximum transmittivity. However, in that case, given the relatively small slope of the transmittivity-optical path length characteristic, (which slope has a maximum value on the curve referenced I of $4\pi/(\lambda n)$, giving an absolute value of $4\pi/(\lambda n)$, the corresponding variation required in the refractive index and in the optical path length of the crystal written $\Delta(nl)_C$ is large, which gives rise to a low value for the real contrast in the spatial modulation of the refractive index of crystal 1.

Also in FIG. 1b, there is a continuous line curve II showing the transmittivity-optical path length characteristic of a spatial light modulator device of the present invention in which the crystal 1 has been placed in the optical cavity 2 of the interferometer system. In this case, it may be observed that the absolute value of the slope of the characteristic is multiplied by a factor of about 10, given the selectivity of the interferometer system at the corresponding wavelength. In this case, since the slope for a given curve in FIG. 1b is $\Delta T/\Delta(nl)_{IFP}$, for the same variation in transmittivity $\Delta T$, the variation required in the optical path length, written $\Delta(nl)_{IFP}$ is much smaller than the corresponding variation in the optical path length of a conventional type of spatial light modulator device $\Delta(nl)_C$, with said reduction naturally corresponding to a reduction in the ratio of the characteristic slopes of curves I and II, since the ratio of the slopes equal the ratio of the optical path lengths.

It can thus be understood that with the spatial light modulator device of the present invention, the same variation in transmittivity can be obtained with a much smaller variation in optical path length, thus making it possible to use light beams that are less intense, and making it possible to improve detection. In addition, the steeper slope of the device in association with a suitably chosen working point makes it possible to increase the information-containing component of the signal and the contrast of the signal.

As shown in FIG 1a, it will be observed that to obtain the spatial light modulator device of the present invention, the crystal 1 is placed between the mirrors, with the mirrors 21 and 22 delimiting the optical cavity constituting the interferometer.

It will also be observed that the photo-refractive crystal 1 may be constituted by a photochromic crystal and/or a photo-refringent crystal, given that some crystals may present both photochromic and photo-refringent properties, in particular dielectric photo-refractive crystals.

Naturally, the crystal 1 may be constituted by a crystal of tantalum potassium niobate having a general formula $KTa_{(1-x)}Nb_xO_3$, $0 \leq \times 23 \; 1$, since this type of crystal can be constituted by a crystal with single or double doping. It is recalled that crystals of this type with single or double doping can be doped either with iron, or else with a composition of iron and chromium. Other crystals, such as strontium, may also be employed.

In accordance with the present invention, it is possible to select, as a function of the refractive index and absorption characteristics of the crystal, as a function of the characteristics of the write beam fe and of the read beam fl, and as a function of the characteristics of the interferometer which acts as a selective filter at the wavelength $\lambda f$ of the interferometer, the appropriate wavelengths for the write beam and for the read beam fe and fl so as to obtain a refractive index and an optical path length corresponding to optimum transmittivity, written $TO_{IFP}$, given substantially by a relative transmittivity of values ½ in FIG. 1b, thereby obtaining the best dynamic range for amplitude variation of the transmittivity $\Delta T$.

However, according to a particularly advantageous aspect of the device of the present invention, the optimum operating point $TO_{IFP}$ may advantageously be adjusted by means of an electric field enabling the value of the refractive index of crystal 1 to be adjusted.

Figure 2A:
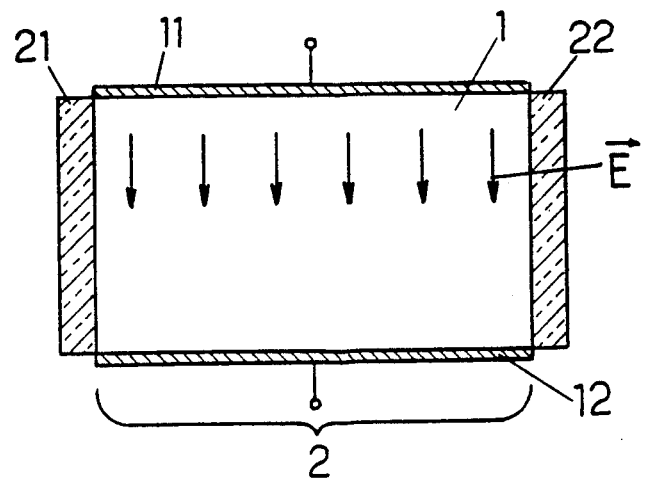
FIGS. 2a is a section on a longitudinally plane of symmetry through a first embodiment of a spatial light modulator device of the present invention.

To this end, and as shown in FIG. 2a, the crystal 1 is further provided with a pair of facing electrodes. These electrodes referenced 11 and 12 are for the purpose of applying the optimum operating point adjusting electric field E to the crystal. This electric field may be a stationary electric field or it may possibly be a pseudo-stationary field, and since the pseudo-stationary nature of the electric field is defined relative to the optical wavelengths of the write beam fe and of the read beam fl, the frequency of the pseudo-stationary field may be as high as a few MHz. The presence of a stationary or a pseudo-stationary electric field then makes it possible to adjust the means value of the refractive index and the optical path length corresponding to the optimum operating value, which corresponds to the amplitude value that gives maximum symmetrical variation on the transmittivity-optical path length characteristic.

As shown in FIG. 2a, the electrodes 11 and 12 may be constituted by an electrically conductive material, the electrodes being placed on two facing faces adjacent both to the write face and to the read face of the crystal. By way of non-limiting example, the electrodes 11 and 12 may be constituted by a layer of vacuum metallization applied to the facing faces adjacent to the write face and to the read face of the crystal. The metallization may be constituted by a deposit of aluminum, of gold, or of indium, and may have a thickness of a few micrometers.

It may be observed that the dielectric mirrors 21 and 22 may be made, for example, by depositing a layer of magnesium fluoride having a thickness equal to one-fourth of the wavelength of the write light beam or of the read light beam fe or fl respectively.

Figure 2B:
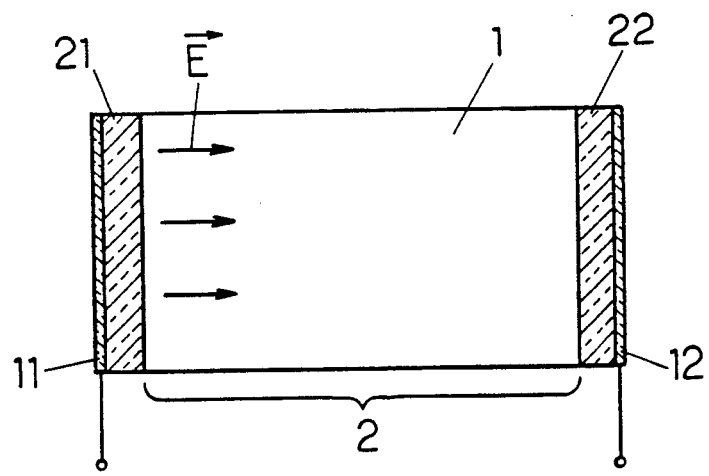
FIG. 2b is likewise a section on a longitudinal plane of symmetry through a second embodiment of a spatial light modulator device of the present invention.

In addition, in an embodiment as shown in FIG. 2b, the electrodes 11 and 12 may be constituted by electrically conductive layers that are transparent at the filter wavelength $\lambda f$ of the interferometer containing the crystal 1. It may be observed that it is, in fact, preferably for the electrodes 11 and 12 to be placed on the mirrors 21 and 22 delimiting the optical cavity. Naturally, under these circumstances, the electrodes 11 and 12 are constituted, for example, by a vacuum deposit of indium having a thickness of about 1 micrometer. At such thickness, indium has the special feature of being electrically conductive while also being transparent to visible radiation.

It may be observed in FIGS. 2a and 2b that the direction of the electric field E is transverse to the direction propagation of the write and read light beams fe and fl in the case shown in FIG. 2a, whereas in the case shown in FIG. 2b, the electric field E is parallel to the direction of propagation of said light beams through the crystal. In both cases, the electric field E can thus provide a corresponding electrical polarization of the crystal and a corresponding adjustment of the mean value of its refractive index. It may be observed that the value of the electric field should be of the order of a few kV per centimeter, with the crystals of the present invention used as the crystal 1 having a length of 500 micrometers at most.

There follows a more detailed description of the way in which the light modulator device shown in FIG. 2a or 2b operates.

In general, tantalum potassium niobate crystals having the above-mentioned formula have a ferroelectric phase transition at a critical temperature written Tc, which temperature depends on the niobium concentration x. It may be observed that this concentration is of the order of 8.5K/1% per mole of niobium, and that for $x=35\%$, the critical temperature Tc is equal to 300 kelvins.

In the para-electric region at a temperature Te, i.e. for Te>Tc, the crystal has a cubic crystal lattice, and thus unlike all usual photo-refractive crystals, the electro-optical effect as a function of the amplitude $E_\phi$ of the electric field obeys a quadratic relationship given by the following equation:

$$\Delta n = \tfrac{1}{2} n_o^3 g(\epsilon_o \epsilon E_o)^2$$

In this equation, $\Delta n$ is the birefringence of the crystal, $n_o$ is the refractive index, g is the electro-optical coefficient of the crystal, $\epsilon$ is the relative dielectric constant, where $\epsilon_o$ represents the absolute dielectric constant in the MKSA system of units, and $E_o$ is the amplitude of the stationary or pseudo-stationary electric field applied to the crystal. It may be observed that for a temperature Te such that $T_e - T_c = 10°$ K., the value of the relative dielectric constant $\epsilon$ is equal to $10^4$.

Two mechanisms have been shown to be involved in the photo-refractive effect of crystals of the above type.

A first mechanism referred to as the "space charge photo-refractive effect" is as follows: when image patterns contained in the write light beam are formed in the crystal by the beam, space charges spatially correlated with said patterns are induced, providing that certain charge transport mechanisms are present. These transport mechanisms may be constituted, for example, either by the presence of an external electric field, or else by a phenomenon whereby the charges diffuse, e.g. because the dielectric material constituting the crystal has a loss factor which is large enough.

When in the presence of an external electric field, these space charge fields are transformed into refractive index gradient fields, given by the equation:

$$\delta(\Delta n)_{sc} = n_o^3 g(\epsilon_o \epsilon)^2 E_o E_{sc}$$

In the above equation, it is nevertheless assumed that the diffusion field written $E_{sc}$ is much less than the field $E_o$ which constitutes the above-mentioned stationary or pseudo-stationary field.

Modulation depth, i.e. the corresponding variation of refractive index in crystal 1, and thus of contrast as mentioned above, is proportional to the amplitude of the stationary or pseudo-stationary field $E_\phi$. Thus, once the pattern has been written in the crystal medium, i.e. once spatial modulation of the refractive index has been achieved, it becomes possible to switch said modulation merely by applying the external electric field of amplitude $E_{100}$. In addition, because of the dielectric constant $\epsilon$ n the vicinity of the phase transition is large, the space charge variations induced in the refractive index are very large, typically $\Delta_n = 0.001$ for $E_o = 1$ kV/cm at a temperature $Te - T_c = 10°$ K.

The second mechanism is the "dielectric photo-refractive effect". With this second mechanism, the input light field, i.e. the write light beam fe, gives rise to a metastable modification of the oxidation state of the impurity atoms by photo-ionization of the electrons in impurity atoms of one type and by the electrons being captured by impurity atoms of another type. These metastable modifications give rise to modifications in the phase transition temperature of the crystal, i.e. the temperature $T_c$. When a crystal is at a temperature that is slightly greater than the critical temperature $T_c$, i.e. when the crystal is in its cubic crystal phase, such modifications in the critical temperature $T_c$ have a very large effect on the relative dielectric constant $\epsilon$, in accordance with the Curie-Weiss law. The application of a uniform external electric field to such a crystal then makes it possible to transform the small induced transformation of the value of the relative dielectric constant $\epsilon$ into static or low frequency modulation. This then induces corresponding modulation of the refractive index via the quadratic electro-optical effect.

The dielectric photo-refractive effect in a crystal in its cubic crystallographic phase and as a function of critical temperature variation $\Delta T_c$ for phase transition as induced by the read or write light beam is a function of the external electric field applied during the read process and is given by the equation:

$$\delta(\Delta n)_d = n_o^3 g \Delta T_c (\epsilon \epsilon_o E_o)^2 / (T_e - T_c)$$

In the above equation, the expression $\Delta n = n_o - n_e$ where $n_o$ and $n_e$ represent the ordinary and the extraordinary refractive indices of the crystal, g is the electro-optical coefficient of the crystal, and $T_e$ is the absolute temperature of the crystal.

It is shown that the theoretical expression for the yield of the dielectric photo-refractive effect is given by the equation:

$$S^{(DPRE)} = n_o^3 g (dT_c/dN) P r^2 [h\nu e(T_e - T_c)]$$

In the above equation, $dT_c/dN$ represents the variation in critical temperature $T_c$ per absorbed photon, hv is the excitation energy in electron-volts, h is Planck's constant, e is the charge of an electron, and Pr is the optimum static electric polarization induced by the applied electric field during the read process. Assuming that the upper limit of the yield S is obtained when the dielectric photo-refractive effect is equivalent to creating an oxygen deficiency in, for example strontium SrTiO, then $S = 10^{-3}$ cm$^3$/J.

It may be observed that the existence of the dielectric photo-refractive effect has been experimentally verified by means of a method enabling the dielectric photo-refractive effect to be distinguished from the space charge photo-refractive effect. For a more detailed description of how the above method is implemented and for a more ample description of the experimental results obtained, reference may be made, for example, to the publication by A. Agranat and Y. Yacoby entitled "Photorefractive effect produced by photoinduced metastable changes in the dielectric constant" published in issue B 27 of the journal Physical Review, No. 5712 (1983).

For the experimental results, it is merely stated that for a sample of the type $KTa_{0.924}$, $Nb_{0.076}$ $O:Fe_{0.002}$ $Cr_{0.01}$, which is a doubly-doped crystal having a critical temperature $T_c = 8.5°$ K., it has been observed that at a crystal temperature of $T_e = 92°$ K. and under excitation at a wavelength $\lambda = 4880$ Å, the photo-refractive yield S is given by $S = 6 \times 10^{-5}$ cm$^3$/J. This result shows that the photo-refractive yield in this case is approximately three times greater than when using a lithium niobate crystal of the form $LiNbO_3$:Fe with single doping using iron.

It may also be observed that the photo-refractive effect of potassium tantalum niobate crystals (KTN crystals) with double doping presents very high photochromic effect properties.

Although low or double doped KTN type crystals are particularly suitable for implementing a spatial light modulator device of the present invention, it may be observed that the use of conventional photo-refractive crystals such as bismuth selenide crystals having a general formula BSO may also be advantageous, for example.

However, the use of crystals of low or double doped KTN type may give rise to the following advantages over more conventional type crystals of the BSO type:

The space charge photo-refractive effect in KTN crystals with low doping is very sensitive, and in particular an order of magnitude more sensitive than for BSO type crystals. Consequently, the use of KTN crystals with low doping can provide devices that are very sensitive.

For KTN type crystals with double doping, i.e. crystals of the following types: KTN:Ti,Fe KTN:Cr,Fe and KTN:Cr,V have a significant photochromic effect. Although less sensitive then the space charge photo-refractive effect, the photochromic effect has two advantages for spatial light modulators: firstly it is very easy to control the photochromic effect experimentally; and secondly, because sensitivity does not constitute a parameter of major importance in conoscopic holography devices, and because the crystal can be reactivated by adjusting the intensity of the read beam fl, a photochromic effect spatial light modulator can be implemented without any difficulty.

Given that the dielectric constant of KTN type crystals is very high in the vicinity of the transition to ferro-electric phases, with values that may reach or even exceed 10 at the critical temperature $T_c$, it is possible to make use of comparatively weaker electric fields for controlling and adjusting the operating point. As a result, in the spatial light modulator of the present invention, it is possible to use stationary or pseudo-stationary electric fields of amplitude $E_\phi$ of the order of one kV per centimeter, whereas the electric field required for BSO type crystals is about 10 kV per centimeter.

The main obstacle to developing high resolution devices using the conventional space charge photo-refractive effect is the phenomenon of charge migration which is characteristic of this type of device. It is possible under present circumstances to use the dielectric photo-refractive effect without there being any change migration. This merely requires the electric field to be switchable and to be switched off (eliminated) during the write process, with the electric field being switched back on (re-established) during the read process while using a read beam fl of appropriate wavelength.

In particular, it may be observed that with respect to the wavelengths of the read and write beams suitable for use with spatial light modulator devices of the present invention, that the read and write beams may be constituted by beams of white light or by beams of monochromatic light. In either case, the radiation used may be non-coherent. It will be observed that because an interferometer system such as a Fabry-Perot type interferometer system is used during reading, the system always acts as though it were a monochromatic filter. It is thus possible to address the system with white light, for example, with the system taking account only of monochromatic light lying in the operating range of the interferometer.

In non-limiting manner, the spatial light modulator device of the present invention may be used in conoscopic holography systems for the purpose of improving the performance thereof by eliminating the CW component of the corresponding conoscopic holographic image, thereby providing a conoscopic holography system having a large dynamic range. Such a system is shown diagrammatically in FIG. 3.

As shown in this figure, the system may comprise a conoscopic type device 30 which delivers a conoscopic image in the form of a light beam representative of the image. By way of non-limiting example, the conoscopic device 30 may be constituted by the corresponding device described in U.S. Pat. No. 4,976,504 incorporated in the present description by way of reference.

Figure 3:
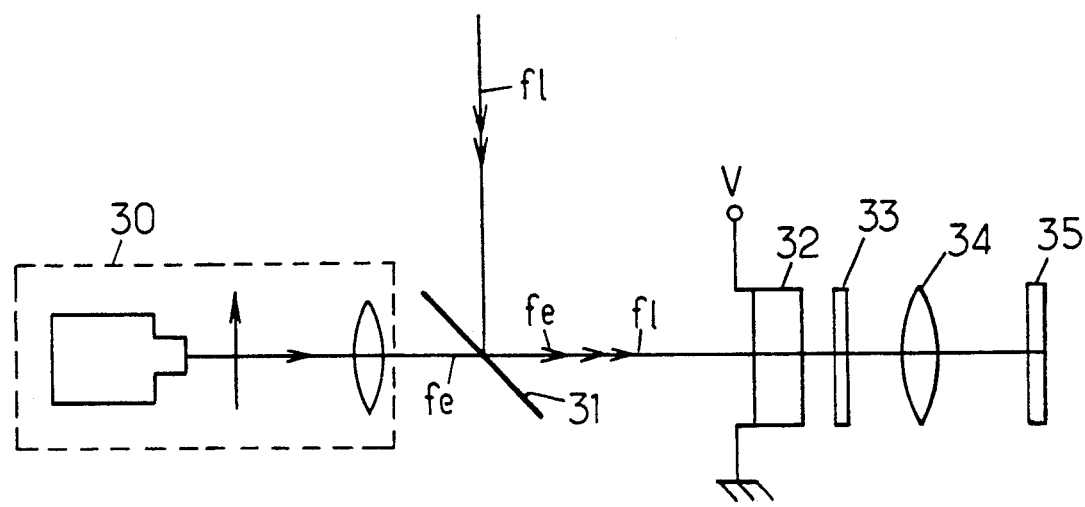
FIG. 3 is a general view of a conoscopic holography system of large dynamic range incorporating a spatial light modulator device of the present invention.

In addition, the system shown in FIG. 3 includes a dichroic mirror 31 inclined at 45 degrees relative to the direction of the light beam representing the conoscopic image.

The conoscopic holography system of large dynamic range as shown in FIG. 3 further includes a spatial light modulator device 32 of the present invention. This spatial light modulator device receives, from the dichroic mirror 31, both the read light beam referenced fl and the light beam representative of the conoscopic image, which light beam then constitutes the write light beam fe for the spatial light modulator device 32.

Finally, it may be observed that downstream from the spatial light modulator device 32 it may be advantageous to dispose an optical filter 33 at the wavelength λf of the Fabry-Perot type interferometer constituting the spatial light modulator 32 followed by a focusing lens system 34 and a detector device 35 such as a CCD camera, for example.

The spatial light modulator of the present invention thus provides particularly high performance since its large dynamic range or differential gain in accordance with the invention corresponds to the slope of characteristic II in FIG. 1b, and this differential gain is independent of the CW level of the write or read light beam over a wide range of transmittivity values. In addition, the possibility of adjusting the operating point to an optimum value such as the value $TO_{IFP}$ in FIG. 1b, which optimum operating point corresponds to the maximum slope of the above-mentioned characteristic II, and which operating point control can be obtained by means of the applied external stationary electric field, further makes it possible in the embodiment of the conoscopic holography system shown in FIG. 3 to eliminate the CW component of the holographic beam carrying the conoscopic holography image information and acting as the write beam in the incorporated spatial light modulator.

We claim:

1. A spatial light modulator comprising:
   an interferometer system having an optical cavity;
   a photorefractive crystal, having a transmittivity which changes rapidly with a change in refractive index, positioned in said optical cavity;
   means for directing a write beam containing analog information onto said crystal, said write beam comprising a wavelength at which said crystal absorbs, resulting in modification of the refractive index of said crystal, thus altering the optical path length of said interferometer system, resulting in a transmittivity-optical path length characteristic curve having a steep slope; and
   means for directing a read beam onto said crystal, said read beam comprising a wavelength at which optical characteristics of said crystal after modification vary in accordance with said analog information, said spatial light modulator having a dynamic range of amplitude variation of said analog information due to said modification of said crystal which corresponds to said slope of said transmittivity-optical path length characteristic curve.

2. A device according to claim 1, wherein said interferometer system comprises a Fabry-Perot interferometer comprising mirrors delimiting said optical cavity of the interferometer system.

3. A device according to claim 2, wherein said crystal is placed between said mirrors, one of the mirrors delimiting said cavity being placed on an input face of said crystal, and the other one of said mirrors being placed on an output face of said crystal.

4. A device according to claim 1, wherein said crystal is a photochromic and photo-refringent crystal.

5. A device according to claim 1, wherein said crystal is further provided with a pair of electrodes for applying a relatively stationary electric field to said crystal, thereby enabling the mean value of the refractive index and the corresponding optical path length to be adjusted to an optimum value corresponding to the value providing maximum symmetrical variations in the transmittivity on said transmittivity-optical path length characteristic curve.

6. A device according to claim 5, wherein said interferometer comprises a Fabry-Perot interferometer having mirrors delimiting said optical cavity and said field is transverse, said electrodes being perpendicular to the mirrors and being constituted by respective layers of electrically conductive material that is transparent at a filter wavelength f of the Fabry-Perot interferometer.

7. A device according to claim 5, wherein said interferometer having mirrors delimiting said optical cavity comprises a Fabry-Perot interferometer and said field is longitudinal, said electrodes being parallel to the mirrors and being constituted by respective layers of electrically conductive material that is transparent at a filter wavelength f of the Fabry-Perot interferometer, the transparent electrodes being placed on two faces of said crystal.

8. A device according to claim 5, further comprising means for selectively actuating said relatively stationary electric field in order to eliminate electric charge migration caused by the space charge dielectric photo-refractive phenomenon during the write and read processes.

9. A device according to claim 5, wherein said interferometer comprises a Fabry-Perot interferometer having mirrors delimiting said optical cavity and said field is transverse, said electrodes being perpendicular to the mirrors and being constituted by respective layers of electrically conductive material that is non-transparent at the filter wavelength f of the Fabry-Perot interferometer.

10. A device according to claim 1, wherein said crystal is a dielectric photo-refractive crystal.

11. A device according to claim 1, wherein said crystal is a singly-doped potassium tantalum niobate crystal having the general formula $KTa_{(1-x)}Nb_xO_3$.

12. A device according to claim 1, wherein said crystal is a doubly-doped potassium tantalum niobate crystal having the general formula $KTa_{(1-x)}Nb_xO_3$.

13. A system according to claim 1, wherein the slope of said characteristic curve is on the order of ten times that of a photo-refractive crystal having a substantially sinusoidal transmittivity-optical path length characteristic curve.

14. A conoscopic holography system of large dynamic range comprising:

a conoscope delivering a conoscopic image in the form of a first light beam representative of said conoscopic image; and a spatial light modulator device including a photo-refractive crystal placed in the cavity of an interferometer system having a transmittivity-optical path length characteristic curve having a steep slope so as to induce a dynamic range of maximum variation in said transmittivity for minimum variation in the refractive index of said crystal, said spatial light modulator device receiving both a read light beam and said first light beam representative of the conoscopic image, said first light beam constituting a write beam for said spatial light modulator device, and the two light beams being combined on the modulator device by means of an optical system for combining said light beams.

15. A conoscopic holography system according to claim 14, wherein downstream from the spatial light modulator device the system includes an optical filter system, and followed by a detector device of the CCD camera type.

16. A conoscopic holography system according to claim 14, wherein downstream from the spatial light modulator device the system includes a hybrid filter system followed by a detector device of the CCD camera type.

17. A system according to claim 14, wherein the slope of said characteristic curve is on the order of ten times that of a photo-refractive crystal having a substantially sinusoidal transmittivity-optical path length characteristic curve.

* * * * *